United States Patent
Reames, Jr.

(10) Patent No.: US 10,739,123 B2
(45) Date of Patent: Aug. 11, 2020

(54) STEM NUT THREAD WEAR ANALYSIS APPARATUS AND METHOD

(71) Applicant: Carter Reames, Jr., Gonzales, LA (US)

(72) Inventor: Carter Reames, Jr., Gonzales, LA (US)

( * ) Notice: Subject to any disclaimer, the term of this patent is extended or adjusted under 35 U.S.C. 154(b) by 0 days.

(21) Appl. No.: 15/616,812

(22) Filed: Jun. 7, 2017

(65) Prior Publication Data
US 2018/0356198 A1    Dec. 13, 2018

(51) Int. Cl.
*G01B 3/48* (2006.01)
*G01B 5/16* (2006.01)
*F16K 37/00* (2006.01)

(52) U.S. Cl.
CPC ............ *G01B 3/48* (2013.01); *F16K 37/0083* (2013.01); *G01B 5/163* (2013.01)

(58) Field of Classification Search
CPC ....... F16K 37/0083; G01B 3/48; G01B 5/163; G01B 5/166; G01B 7/284
See application file for complete search history.

(56) References Cited

U.S. PATENT DOCUMENTS

| | | |
|---|---|---|
| 3,721,133 A | 3/1973 | Denkowski |
| 3,857,547 A | 3/1974 | Profet |
| 4,337,649 A * | 7/1982 | Stagg .................... G01M 13/02 73/115.01 |
| 5,224,512 A | 7/1993 | Nogami et al. |
| 5,487,302 A * | 1/1996 | Casada ................ F16K 31/046 73/168 |
| 5,594,175 A * | 1/1997 | Lyon ........................ F16K 31/04 73/168 |
| 5,616,829 A * | 4/1997 | Balaschak ............ F16K 31/046 137/551 |
| 5,620,166 A | 4/1997 | Lord et al. |
| 6,799,928 B2 | 10/2004 | Port-Robach |

(Continued)

FOREIGN PATENT DOCUMENTS

| | | |
|---|---|---|
| JP | 2002277233 A * | 9/2002 |
| JP | 2003302215 A * | 10/2003 |

(Continued)

OTHER PUBLICATIONS

Reames et al.; "Mitigating MOV Stem Nut Failure Through Proper Maintenance and Wear Measurement"; Sep. 19, 2017; KCI Publishing; Valve World Magazine; <http://www.valve-world.net/webarticles/2017/09/19/mitigating-mov-stem-nut-failure-through-proper-maintenance-and-wear-measurement.html> (Year: 2017).*

*Primary Examiner* — John Villecco
(74) *Attorney, Agent, or Firm* — John B. Edel; Edel Patents LLC

(57) ABSTRACT

A method of quantifying stem nut thread wear in a valve having a valve stem that is positioned with a stem nut. A tool is mounted to, and rotates with, the stem nut, while simultaneously measuring stem displacement. The method of orienting the stem nut threads where one 360° rotation will capture all of the thread backlash in addition to any stem displacement. The measured stem displacement, including stem nut thread backlash, can then be used, with certain stem geometry parameters, to calculate stem nut thread wear percent and quantify remaining stem nut thread material.

6 Claims, 2 Drawing Sheets

(56) References Cited

U.S. PATENT DOCUMENTS

| | | | | |
|---|---|---|---|---|
| 7,516,656 | B2* | 4/2009 | Nogami | F16K 37/0083 |
| | | | | 73/168 |
| 7,549,440 | B1* | 6/2009 | Campbell | F16K 37/0008 |
| | | | | 116/277 |
| 7,627,953 | B2* | 12/2009 | Richter | C04B 35/522 |
| | | | | 33/199 R |
| 8,322,298 | B2* | 12/2012 | Labat | G01B 3/48 |
| | | | | 116/208 |
| 8,733,269 | B2* | 5/2014 | Labat | G01B 3/48 |
| | | | | 116/208 |
| 9,752,859 | B2* | 9/2017 | Labat | G01B 3/48 |
| 2002/0095986 | A1* | 7/2002 | Ito | G01M 13/02 |
| | | | | 73/168 |
| 2008/0034882 | A1* | 2/2008 | Ohta | F16K 37/0083 |
| | | | | 73/777 |
| 2012/0060745 | A1* | 3/2012 | Labat | G01B 3/48 |
| | | | | 116/201 |
| 2013/0152846 | A1* | 6/2013 | Labat | G01B 3/48 |
| | | | | 116/201 |
| 2014/0299040 | A1* | 10/2014 | Labat | G01B 3/48 |
| | | | | 116/201 |
| 2017/0261124 | A1* | 9/2017 | Delgado | F16K 37/0083 |

FOREIGN PATENT DOCUMENTS

| | | | |
|---|---|---|---|
| JP | 2010261587 A | * | 11/2010 |
| JP | 2019173789 A | * | 10/2019 |

* cited by examiner

STEM NUT THREAD WEAR ANALYSIS APPARATUS AND METHOD

CROSS-REFERENCE TO RELATED APPLICATIONS

Not applicable

BACKGROUND OF THE INVENTION

1. Field of the Invention

The present invention relates to acme thread wear, particularly stem nut thread wear for a valve having a threaded valve stem and a threaded stem nut that moves the valve stem responsive to a rotation of the stem nut. More particularly, the present invention relates to a method and apparatus for detecting stem nut thread wear for any valve that has a threaded stem operated by rotation of a stem nut and wherein this apparatus is not an as-manufactured part of the valve to be inspected.

2. General Background of the Invention

A motor operated valve or MOV equipment can employ an externally-threaded rising stem. This rising stem is operated by an internally-threaded rotating stem nut. One of the problems that plagues pipelines, nuclear plants, water treatment plants and other such facilities is the failure of the stem nut while it is in service.

A MOV stem nut is typically made of a softer material (such as a bronze alloy) than the material used to make the stem (usually carbon or stainless steel). Stem nut thread wear is preferential to having wear occur on the valve stem (as the stem nut is typically much easier to replace than the valve stem).

With use, the stem nut threads will wear when opening and closing the valve. The wear can be influenced by several factors. These factors can include the stem nut material, normal operating loads, and maximum loads for example.

Other factors that influences wear are the number and frequency of valve strokes, stem nut manufacture, threaded length, stem-to-stem-nut fit, valve stem condition, lubrication and environmental contamination.

On rising-stem valves, a stem nut transfers rotational motion (torque) of a motor operated gearbox or manual valve to axial stem movement (thrust). Stem nut failure will prevent valve operation and may cause valve position indication to be incorrectly displayed in a control room. If the motor operated valve is electrically or mechanically interlocked, its failure can also interfere with the operation of other plant equipment resulting in a potentially costly or catastrophic failure event.

Unfortunately, most MOV users do not take a proactive approach to maintaining their stem nuts because they are difficult to access and intrusive to remove and inspect. Also, removing a stem nut will cause the valve to be inoperable and out-of-service during the inspection. In most cases, a failure may take many years to occur promoting an "out-of-sight, out-of-mind" approach to maintaining them.

Even if stem nut removal for inspection is being performed, measuring the stem nut thread wear on a removed small-diameter stem nut can be very difficult as space is limited inside the stem nut to get a direct measurement with dial calipers.

Excessive stem nut thread wear represents a potential common cause failure mode that could impact all rising stem valves. The unexpected failure of stem nuts, and resulting consequence, emphasizes the importance of improving conditions, monitoring maintenance practice activities, and identifying, quantifying and minimizing stem nut thread wear. It is important for any maintenance program to also detail proper stem cleaning and lubrication procedures.

The valves to be tested are not always gate valves, but any valve using a threaded stem and nut.

SUMMARY OF THE INVENTION

It is assumed that the stem is cut properly (which is not always the case)—thus, as part of the method, it is preferable to use a pitch gauge on the stem threads to make sure that the assumption is correct.

At some facilities, valve stems tend to corrode instead of wearing.

The tool of the present invention was validated using a test jig, where it appears that the tool can predict wear with better than 97% accuracy.

The valve stems at most facilities are 29-degree, general purpose or stub acme threads, and can have 1, 2, 3 or 4 thread starts.

The following table lists patents and applications, the order of listing being chronological.

GENERAL DISCUSSION OF THE PRESENT INVENTION

The stem nut thread wear analysis apparatus and method "invention" of the present invention was developed to provide an accurate, non-intrusive and quick means of quantifying stem nut thread wear without having to remove the valve from service. This process quantifies the backlash between the stem and stem nut threads on rising stem valves. Using the apparatus and method of the present invention, it is possible to quantify the remaining stem nut thread metal found at the base of the worn thread dimension "X".

Nonintrusive stem nut thread wear detection can find its roots in nuclear plant MOV diagnostics. MOV diagnostics are required by the Nuclear Regulatory Commission as necessary to prove operability of valves needed to safely shut down a nuclear plant during an emergency event. As early as the mid 1990's, the backlash "zero" region in the stem thrust/time trace could provide an indication that excessive stem nut thread wear could exist.

The apparatus and method of the present invention can be used to more cost-effectively and accurately measure the same event.

The area of interest is identified as X=P−Fcs (base of the stem nut thread indicated by X) in FIG. 1 where P is the thread pitch and Fcs is the basic flat at crest of the stem thread (Reference: Machinery's Handbook 25 General Purpose Acme Threads pp 1716-1724). "X" on the stem is considered as 100% of possible stem nut thread material that can be present. The formulas below are used for general purpose acme threads to use stem displacement with thread backlash and P−Fcs to calculate stem nut thread wear percent and remaining thread material. Additional formulas below are used for stub acme threads to use stem displacement with thread backlash and P−Fcs to calculate stem nut thread wear percent and remaining thread material.

The linear relationship between stem nut rotation and stem axial movement can be found in the definition of "Stem Lead"—the distance a stem thread advances axially in one turn of the stem nut. (P−Fcs), or "X", represents 100% of the thickest part of the stem nut 5 thread; this is where the backlash is measured. As the stem nut thread wears, its backlash will increase, allowing more free rotation. The purpose of the method and apparatus of the present invention is to calculate stem nut 5 thread wear percent from backlash. Once the backlash is measured, the percent wear and remaining thread material can be calculated to provide the basis to determine valve operability. The data collected can be used to determine thread structural integrity, and ultimately, to predict its functional-failure point to preempt failure by monitoring stem nut life cycle and wear rate.

In an example of the method of the present invention, it is assumed that the valve stem threads are properly manufactured with a 29-degree angle to the dimensions detailed in the Machinery's Handbook 25 for ACME Thread Design. Terms and Formulae:

"PITCH", defined as the distance from one thread to the same point on the next thread.

"LEAD", defined as the distance a thread advances axially with one stem nut rotation.

"THREAD TYPE", general purpose acme or sub acme.

When properly set up for testing, one revolution of the stem nut will advance the stem 0.3333" minus stem nut wear (backlash). This measured stem displacement can then be used to calculate the remaining stem nut thread thickness and percent wear.

DM Stem Distance Measured in One Rev. of the Stem Nut "inches"
P Stem Pitch
L Stem Lead
D Stem Diameter
Fcs GP Acme Flat at Stem Crest=$((0.3707*P)-0.259*(0.008*\sqrt{D})))$"
Stub Acme Flat at Stem Crest=$((0.4224*P)-0.259*(0.008*\sqrt{D})))$"
T 100% of Possible Stem Nut Thread Wear=(P−Fcs)"
BL Backlash=L−DM"
RT Remaining stem nut thread thickness at base of thread=(T−BL)"
% Wear $$\text{Percent Thread Wear} = \left(\frac{BL}{T}\right) * 100$$

Example: Using the above formula a 1.125" diameter stem with general purpose threads, ⅛" PITCH and ⅓" LEAD will advance the stem nut threads 0.3333" with one 360° revolution. The following measurements are from a test jig with a known stem nut thread wear. Its directly-measured thread thickness at the base of the worn stem nut thread is 0.054" which translates into 49.5% wear.

DM=0.281"
P=⅛"
L=⅓"
D=1.125"
Fcs=0.2739"
T=0.1072"
BL=0.05233"
RT=0.05487"
% Wear=48.8%

To validate the accuracy of the calculation and the method, a series of tests were conducted in several batches of ten tests; five in the open direction and five in the close direction. The test apparatus was removed and reinstalled between each test. The most repeatable data was taken when the valve extension rod 8, was installed as close to centered on stem 4 as possible and the universal tool disk 1 center hole was as close as possible aligned with the center of the stem 4 and as level as possible.

Assuming that the stem 4 threads are cut accurately, quantifying percent wear and remaining thread thickness is substantially a derivative of the backlash measured between the stem and stem nut threads and stem thread configuration. This apparatus and method can be used on a variety of general purpose and stub acme thread types with any diameter, pitch and lead. The test assembly used for validating the math and evaluating the test process has a 1.125" G.P. acme stem with ⅛" pitch and ⅓" lead and mated with worn stem nut.

BRIEF DESCRIPTION OF THE SEVERAL VIEWS OF THE DRAWINGS

For a further understanding of the nature, objects, and advantages of the present invention, reference should be made to the following detailed description, read in conjunction with the following drawings, wherein like reference numerals denote like elements and wherein.

DETAILED DESCRIPTION OF THE INVENTION

Figure 1:
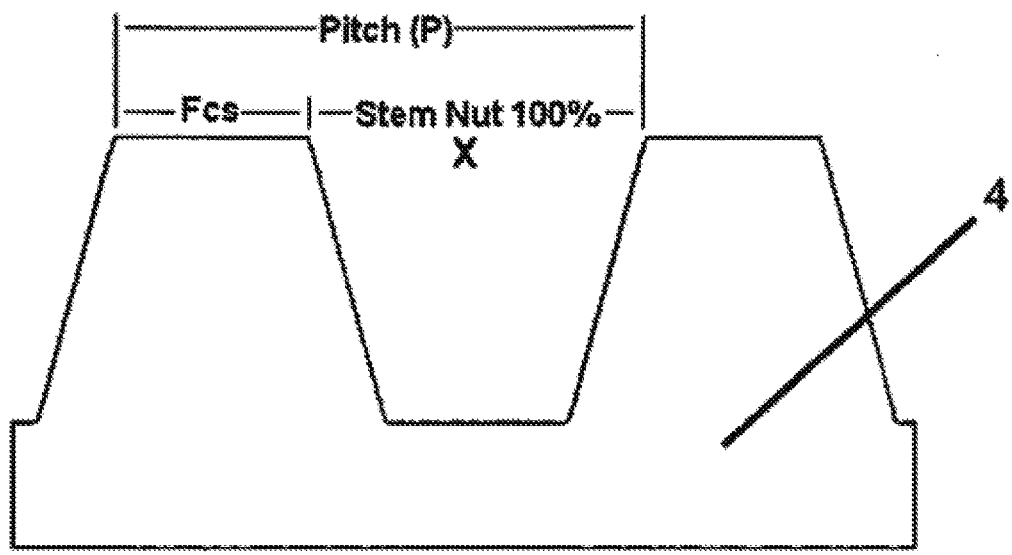
FIG. 1 is a cross section profile of a general purpose acme stem thread with a basic formula depicting how the formula calculates the stem nut thread base thickness.
Figure 2:
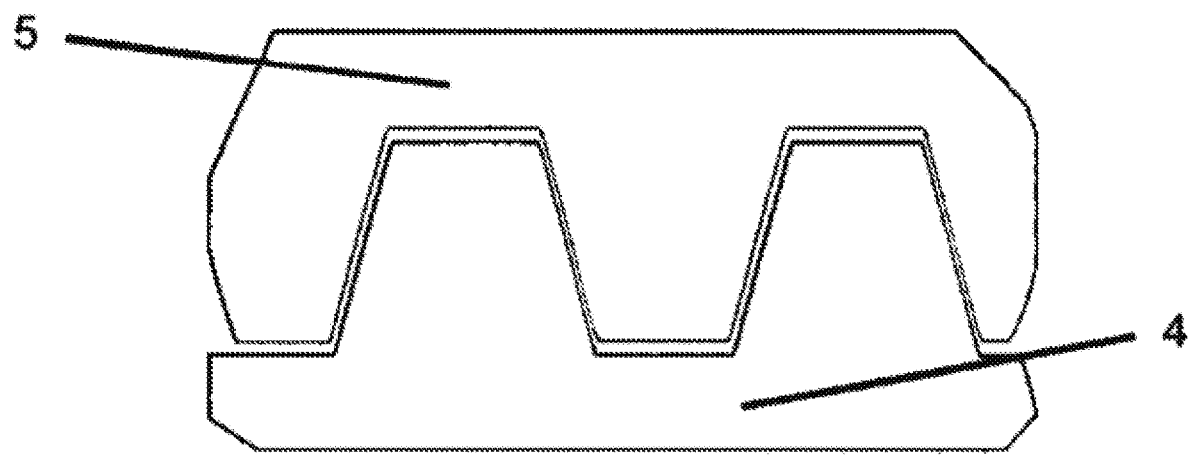
FIG. 2 is a cross section profile of a general purpose acme stem thread mated with an unworn stem nut thread.
Figure 3:
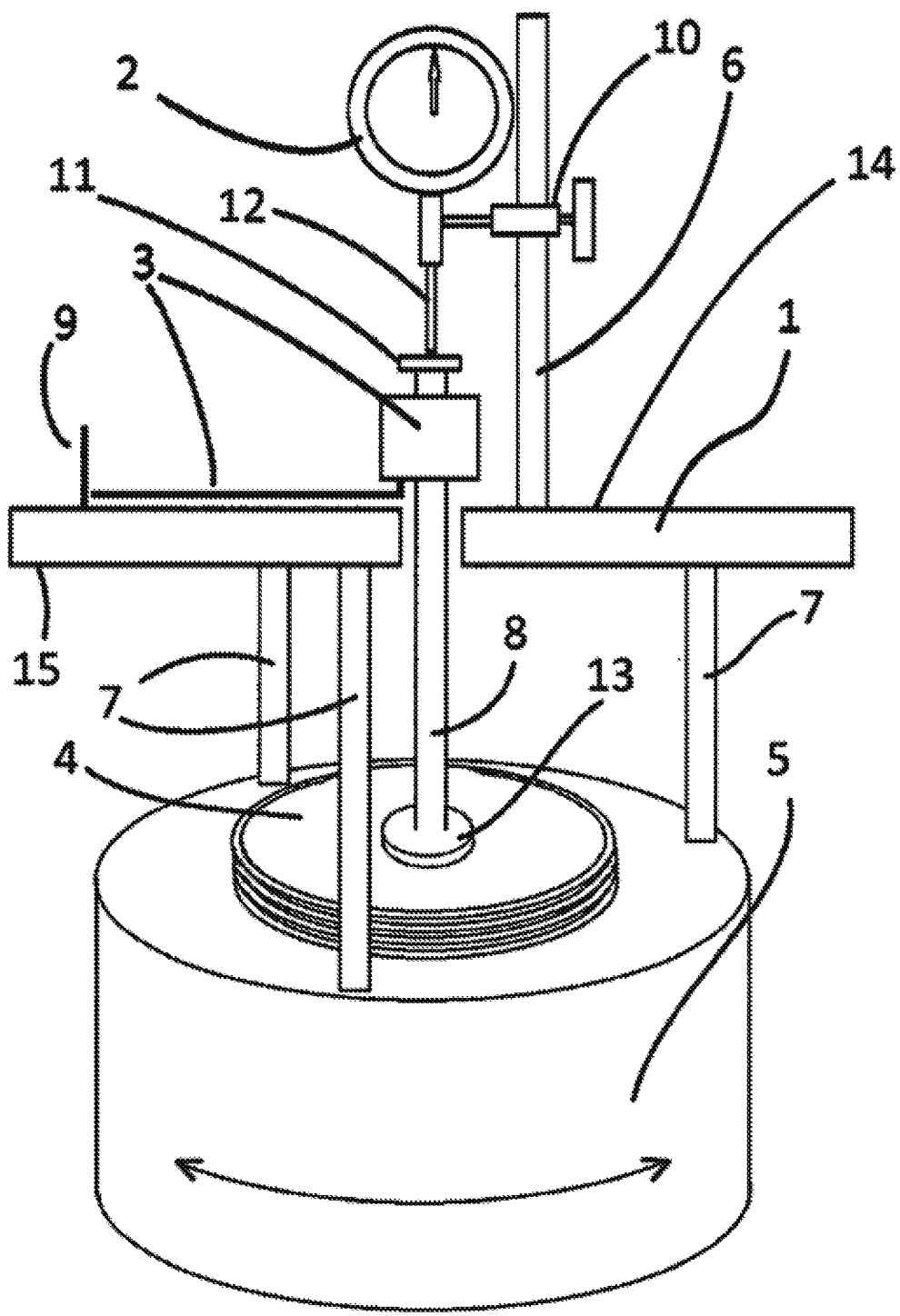
FIG. 3 is a schematic view of a basic embodiment of the apparatus of the present invention connected to the stem and stem nut.

The measuring apparatus is used to measure valve stem nut 5 thread wear on any rising stem valve having a threaded stem nut 5 that mates with and moves the threaded stem 4. The apparatus of the present invention can be used with any diameter stem 4. Mounting rods 7 can be adjusted to properly interface with a valve stem 4 and stem nut 5.

To perform the method of the present invention, the stem protector and indication rod (if installed) are removed. The apparatus is preferably mounted where it will rotate freely with the stem nut 5. The mounting rods 7, when connected to the disk lower portion 15 grooves can be adjusted to adapt the apparatus to interface with most stem 4 and stem nut 5 sizes. Various length mounting rods 7 can be used to adjust for different stem nut 5 depth requirements.

A displacement indicator 2 is used to detect axial stem movement. However, any instrument capable of measuring axial stem movement may be used. A valve stem extension rod 8 and stylus contact button 11 will be required to allow the displacement indicator stylus 12 to contact the top of the valve stem 4. A stem contact button 13 is connected to the lower portion of the valve stem extension rod 8 and, using removable adhesive putty, press on to the center of the grease free valve stem 4. This will allow the valve stem extension rod 8 to remain stationary as the stem nut 5 rotates.

The pointer assembly 3 will be affixed to the valve stem extension rod 8 above the upper portion 14 of the universal tool disk 1, and positioned where it aligns with, and points to, the marker 9. The pointer 3 is installed where it is provided free travel axially as the valve stem 4 travels and rotationally as the stem nut 5 turns 360°. The pointer 3, being indirectly connected to the valve stem 4, will nullify any valve stem 4 rotation that would otherwise induce an error.

FIG. 1 illustrates the profile of a typical general purpose acme thread to explain the basics of how the calculations are used to determine stem nut 5 thread wear from the backlash obtained from performing a test. Once the apparatus is properly installed, and the valve is in the fully closed position, the valve will then be positioned to where the test can be performed. Rotating the hand wheel open will cause the stem nut 5 to rotate.

Universal tool disk 1 can be generally circular and have a central opening. The tool disk lower portion 15 provides three grooves to allow for three threaded bolts to freely slide. To properly adapt the tool disk 1 to the valve stem 5 and stem nut 6, two measurements will be required, stem nut locknut inside diameter and stem nut 5 depth from the top of the actuator housing. Three mounting rods 7 of the proper lengths will then be selected and screwed to the bolts slid into the lower portion 15 grooves. Divide the stem nut locknut inside diameter by two to find the radius then, using the measurement marks, slide and tighten the mounting rods 7 to where the outside of the rods 7 are just inside the measurement mark. It is best to have the mounting rods 7 rest on the stem nut 5 and have an interference fit with the stem nut 5 locknut.

Tool post 6 is threaded to and supported by tool disk 1. Tool post 6 supports displacement indicator 2 which can be any instrument that measures axial stem movement. Displacement indicator stylus 12 will rest on the stylus contact button 11 which is connected to the valve stem extension rod 8 mounted above the pointer 4.

Cleaning the valve stem 4 and the top of the stem nut 5 may be desirable to facilitate the apparatus installation. The apparatus contains a displacement indicator 2, or any similar instrument capable of detecting axial stem 4 movement. The valve stem extension rod 8 will be required to allow the displacement indicator 2 to measure stem 4 movement. The top of the stem 4 needs to be clean of any oily substance to facilitate adhesion of the adhesive putty. Using reusable adhesive putty applied to the bottom of the stem contact button 13 securely press it onto the center of the is valve stem 4 top. Slide the universal tool disk 1 with mounting rods 7 secured to rest on top of the stem nut 5. Add enough valve stem extension rods 8 to extent through the universal disk upper portion 14 at least 1.5". Slide the pointer assembly onto the valve stem extension rod 8 and allow it to rest on the disk upper portion 14. Install the stylus contact button 11 by screwing it to the top of the valve stem extension rod 8.

The apparatus sits atop the stem nut, and rotates therewith as the stem nut is rotated. The test begins with the stem nut 5 threads contacting the stem 4 threads in one direction; this ensures that when the stem nut 5 is rotated in the opposite direction, the 360° of stem nut 5 rotation will include 100% of the thread backlash. The larger diameter universal tool disk 1 has affixed in it a marker that indicates the starting and ending place to ensure exactly 360° of rotation in relationship to the stem-mounted pointer 3. Simultaneous to measuring stem nut 5 rotation, stem 4 displacement is being measured with the displacement indicator 2 through the valve stem extension rod 8. The test will begin with the pointer 3 pointing directly at marker 9 and the displacement indicator stylus 12 resting on the stylus contact button verifying that there is enough stylus 12 travel length to travel at least the distance of stem Lead. Once the universal tool disk 1 has traveled 360°, record the displacement reading. Then, reset the displacement indicator 2 to zero and rotate the universal tool disk 1 in the opposite direction 360° and record the reading. If the two displacement readings are the same, enter the value into the Report Sheet. With the stem 4 Pitch, Lead and Diameter, data correctly entered, percent wear and remaining stem nut 5 thread thickness will be calculated.

Effective operation requires minimal training; however, having a basic mechanical understanding of valve designs would help the technician modify his technique to successfully perform the test. Certain dynamics that could make backlash measuring difficult are:

1. Loose Stem Nut Locknut—This conditions is not relevant if the apparatus is resting directly on the stem nut 5; however, sometimes this is impossible and will have to be mounted to another component that rotates with the stem nut 5. If this alternate location is required, any axial stem nut 5 free play may mask the true backlash amount;

2. System Pressure—Depending on valve design and packing loads, system pressure could make it difficult to find the backlash area due to the stem 4 ejection effect and low packing loads;

3. Stem Orientation—The basic design of the present invention requires the valve stem to be oriented vertical up. Any other orientation will necessitate the tool to be mounted using a locknut compression clamp.

4. Thread Contamination—The presence of hardened grease, broken thread material or any other solid contaminant between the threads may mask the true backlash measured by the present invention.

To perform the method of the present invention with the apparatus, one can perform the following steps:

With the apparatus in place on the stem nut 4 of a closed valve, declutch the actuator if necessary, and rotate the hand wheel open. The actuator usually goes through a lost-motion region as the worm gear advances around the drive sleeve until it contacts lugs on the drive sleeve (referred to as hammer blow). The drive sleeve and stem nut 4 will then start turning. The stem 4, being in a compressed state, may appear to be moving as the mass of the stem 4 metal relaxes. Depending on the amount of valve T-bar slop, system pressure and packing tightness, the stem may continue to rise as the stem T-bar takes up the slop where it connects to the valve. The stem 4 should stop moving even as the stem nut 5 turns indicating stem 4 and stem nut 5 thread disengagement. Stop rotating the hand wheel and reset the displacement indicator 2 where the indicator stylus 12 can travel a distance greater than the thread Lead measurement then, re-zero the displacement indicator 2 reading. Rotate the pointer 3 or universal disk assembly 1 where the pointer is aligned with the marker 9. Continue rotating the hand wheel until the marker 9 on the universal disk 1 returns to where it is realigned with the pointer 3 and record the displacement indicator 2 reading. Then, reset the displacement indicator 2 reading to zero and rotate the hand wheel in the closed direction until the universal disk rotates 360° where the marker 9 and pointer 3 are again aligned; record reading. During this rotation, a "dead space" should have been noticed where the stem 4 and stem nut 5 threads are disengaged, indicating thread backlash. If this backlash event is not seen, there may be excessive system pressure ejecting the valve stem 4 and disk assembly requiring a bleed-down of the line pressure. Once the line pressure is bled down, repeat steps going open, then closed until the displacement 2 readings agree.

The displacement 2 reading will then be entered into the Report Sheet where it will be used with the stem 4 Diameter, Pitch and Lead to calculate the stem nut 5 thread wear percent and remaining thickness at the root of the worn stem nut 5 thread. The Report Sheet will also allow the user to enter a desired percent wear amount and, based on the first and last data points taken, it will automatically extrapolate the date it is estimated it should reach that amount.

To eliminate stem 4 thread wear as the source of measured backlash, one should place a pitch gauge on the stem 4 threads to observe any detectable wear. Also, record on the Report Sheet stem Pitch, Lead and Diameter as these values will be required to perform the necessary calculations.

The tool can be used to measure stem nut thread wear on valves with general purpose and stub acme stems with diameters ranging from 1.125" to 8" with 1, 2, 3 and 4 thread starts. The apparatus can be used only on valve stems pointing straight up however, using a Locknut Compression Clamp the apparatus can be mounted to test many stem nuts driving stems in orientations other than straight up. The all-thread mounting rods 7 screw into the top of the clamps.

The following is a list of parts and materials suitable for use in the present invention:

| Parts Number | Description |
| --- | --- |
| 1 | Universal tool disk |
| 2 | Displacement indicator |
| 3 | Pointer |
| 4 | Valve stem |
| 5 | Stem Nut |
| 6 | Tool Post |
| 7 | Mounting rods |
| 8 | Valve stem extension rod |
| 9 | Marker |
| 10 | Indicator mounting clamp |
| 11 | stylus contact button |
| 12 | Displacement indicator stylus |
| 13 | Stem contact button |
| 14 | Universal tool disk (1) upper portion |
| 15 | Universal tool disk (1) lower portion |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A method for measuring mechanical wear comprising:
   a. contacting a first assembly with a stem nut wherein the first assembly comprises:
      i. a stem nut mount and
      ii. a displacement measurement device;
   b. connecting a second assembly to a threaded valve stem where in the second assembly comprises:
      i. a rod and
      ii. a contact surface
   c. configuring the first assembly relative to the second assembly such that the displacement measurement device contacts the contact surface and such that the displacement measurement device measures an axial displacement of the threaded valve stem relative to the stem nut;
   d. rotating the stem nut to a first point where backlash between the stem nut and the threaded valve stem begins;
   e. rotating the stem nut from the first point to a second point such that a full extent of the backlash between the stem nut and the threaded valve stem is experienced;
   f. using the displacement measurement device to gather information to ascertain the axial displacement of the threaded valve stem relative to the stem nut during the rotation of the stem nut from the first point to the second point;
   g. calculating a quantity of stem nut thread wear using the axial displacement of the threaded valve stem relative to the stem nut during the rotation of the stem nut from the first point to the second point;
   wherein the rotation of the stem nut from the first point to the second point is a single full rotation of the stem nut.

2. The method for measuring mechanical wear of claim 1 wherein the displacement indicator comprises a displacement indicator stylus which contacts the contact surface.

3. The method for measuring mechanical wear of claim 1 wherein the first assembly comprises a marker, wherein the second assembly comprises a pointer, and wherein the marker and the pointer combine to indicate the extent of rotation of the stem nut relative to the threaded valve stem.

4. The method for measuring mechanical wear of claim 1 wherein the first assembly comprises a tool disk, wherein the stem nut mount comprises three stem nut mounting rods and the three stem nut mounting rods attach to the tool disk by way of threaded connections.

5. The method for measuring mechanical wear of claim 1 wherein the first assembly is configured such that the displacement measurement device may be positioned at varying distances from the stem nut.

6. The method for measuring mechanical wear of claim 1 wherein:
   a. the displacement indicator comprises a displacement indicator stylus which contacts the contact surface;
   b. wherein the first assembly comprises a marker, wherein the second assembly comprises a pointer, and wherein the marker and the pointer combine to indicate the extent of rotation of the stem nut relative to the threaded valve stem;
   c. wherein the stem nut mount comprises three stem nut mounting rods and the three stem nut mounting rods attach to the tool disk by way of threaded connections; and
   d. wherein the first assembly is configured such that the displacement measurement device may be positioned at varying distances from the stem nut.

* * * * *